US008195368B1

(12) United States Patent
Leban et al.

(10) Patent No.: US 8,195,368 B1
(45) Date of Patent: Jun. 5, 2012

(54) COORDINATED CONTROL OF TWO SHIPBOARD CRANES FOR CARGO TRANSFER WITH SHIP MOTION COMPENSATION

(75) Inventors: Frank A. Leban, Columbia, MD (US); Gordon G. Parker, Houghton, MI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 317 days.

(21) Appl. No.: 12/587,324

(22) Filed: Sep. 30, 2009

Related U.S. Application Data

(60) Provisional application No. 61/199,418, filed on Nov. 7, 2008.

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |
| *G05B 19/18* | (2006.01) |
| *B66C 13/18* | (2006.01) |
| *B63B 27/00* | (2006.01) |
| *B63B 35/00* | (2006.01) |
| *B65G 67/60* | (2006.01) |

(52) U.S. Cl. .............. 701/50; 701/44; 700/56; 700/279; 212/277; 212/279; 414/139.6; 414/140.3; 414/140.4

(58) Field of Classification Search ............... 414/137.1, 414/139.6, 139.8, 140.3–140.4; 212/277, 212/279; 700/55–56, 279; 701/41–42, 44, 701/50

See application file for complete search history.

(56) References Cited

U.S. PATENT DOCUMENTS 3,090,496 A * 5/1963 Vertrees et al. ............... 212/309

(Continued)

FOREIGN PATENT DOCUMENTS

GB 2096563 A 10/1982

(Continued)

OTHER PUBLICATIONS

U.S. Appl. No. 61/199,418, filed Nov. 7, 2008, invention title "Coordinated Control of Two Shipboard Cranes for Cargo Transfer with Ship Motion Compensation," joint inventors Frank A. Leban and Gordon G. Parker.

(Continued)

*Primary Examiner* — Ramesh Patel
(74) *Attorney, Agent, or Firm* — Howard Kaiser

(57) ABSTRACT

The present invention is typically embodied to exert active control of two same-shipboard cranes performing joint lifting of a payload. Sensory signals indicative of ship motion, and of luff angle and hoist line length of both cranes, are transmitted to a computer. The sensory signals are processed by the computer using a ship motion cancellation algorithm, which solves for values of the respective luff angles and hoist line lengths of both cranes, such values achieving static equilibrium (e.g., zero motion horizontally, vertically, and rotationally in the same vertical geometric plane) of the suspended payload. Inverse kinematic control signals in accordance with the mathematical (e.g., minimum norm) solutions are transmitted by the computer to respective luff angle actuators and hoist line length actuators of both cranes so that the suspended payload tends toward steadiness. Inventive control thus acts on a continual basis to significantly reduce pendulation during the two-crane lifting operation.

15 Claims, 7 Drawing Sheets

U.S. PATENT DOCUMENTS

| | | | | |
|---|---|---|---|---|
| 4,009,843 | A | 3/1977 | Gomez | |
| 4,009,844 | A | 3/1977 | Gomez | |
| 4,083,510 | A | 4/1978 | Gomez | |
| 4,157,812 | A | 6/1979 | Bennett | |
| 4,171,053 | A | 10/1979 | Cecce | |
| 4,178,591 | A * | 12/1979 | Geppert | 340/685 |
| 4,535,900 | A * | 8/1985 | Daniell | 212/310 |
| 4,932,541 | A | 6/1990 | Belsterling | |
| 5,089,972 | A * | 2/1992 | Nachman et al. | 700/218 |
| 5,160,286 | A | 11/1992 | Hill | |
| 5,297,019 | A | 3/1994 | Zuehlke | |
| 5,511,268 | A | 4/1996 | Albus et al. | |
| 5,526,946 | A | 6/1996 | Overton | |
| 5,785,191 | A | 7/1998 | Feddema et al. | |
| 5,908,122 | A * | 6/1999 | Robinett et al. | 212/275 |
| 5,951,226 | A * | 9/1999 | Fantuzzi | 414/141.3 |
| 5,961,563 | A * | 10/1999 | Overton | 701/50 |
| 6,039,193 | A | 3/2000 | Naud et al. | |
| 6,439,407 | B1 | 8/2002 | Jacoff et al. | |
| 6,442,439 | B1 * | 8/2002 | Robinett et al. | 700/55 |
| 6,496,765 | B1 * | 12/2002 | Robinett et al. | 701/50 |
| 6,505,574 | B1 | 1/2003 | Naud et al. | |
| 6,566,834 | B1 | 5/2003 | Albus et al. | |
| 6,631,300 | B1 * | 10/2003 | Nayfeh et al. | 700/55 |
| 6,644,486 | B2 | 11/2003 | Jacoff et al. | |
| 6,826,452 | B1 | 11/2004 | Holland et al. | |
| 7,044,314 | B2 * | 5/2006 | Nayfeh et al. | 212/270 |
| 7,367,464 | B1 * | 5/2008 | Agostini et al. | 212/308 |
| 8,014,982 | B2 * | 9/2011 | Kang et al. | 703/2 |
| 8,025,167 | B2 * | 9/2011 | Schneider et al. | 212/273 |
| 2002/0144967 | A1 * | 10/2002 | Jacoff et al. | 212/274 |
| 2004/0073343 | A1 | 4/2004 | Nayfeh et al. | |
| 2006/0116796 | A1 * | 6/2006 | Fossen et al. | 701/21 |
| 2008/0053945 | A1 * | 3/2008 | Schneider et al. | 212/276 |
| 2011/0038691 | A1 * | 2/2011 | Leske | 414/139.5 |
| 2011/0176898 | A1 | 7/2011 | Bird, III et al. | |

FOREIGN PATENT DOCUMENTS

| | | | |
|---|---|---|---|
| GB | 2150516 | A | 7/1985 |
| GB | 2267360 | A | 1/2003 |

OTHER PUBLICATIONS

U.S. Appl. No. 12/905,114, filed Oct. 15, 2010, invention title "Shipping Container Lifting and Maneuvering Dolly," joint inventors J. Dexter ird, III, Michael J. Plackett, and Frank A. Leban.

Michael J. Agostini, Gordon G. Parker, Kenneth Groom, Hanspeter Schaub and Rush D. Robinett, "Command Shaping and Closed-Loop Control Interactions for a Ship Crane," Proceedings of the American Control Conference, Anchorage, Alaska, May 8-10, 2002, pp. 2298-2304.

Michael J. Agostini, Gordon G. Parker, Hanspeter Schaub, Kenneth Groom and Rush D. Robinett, "Generating Swing-Suppressed Maneuvers for Crane Systems with Rate Saturation," IEEE Transactions on Control Systems Technology, vol. 11, No. 4, Jul. 2003, pp. 471-481.

W. Thomas Zhao and Frank Leban, "Human/Hardware-in-the-Loop Testbed of Cargo Transfer Operations at Sea," ASNE (American Society of Naval Engineers) Joint Sea Basing Conference, Arlington, Virginia, Jan. 27-28, 2005, 10 pages.

William Palmer, "Open-Ocean and At-Anchor Testing Supports Seabasing Initiatives," Wavelengths Online, posted online Mar. 23, 2004, Naval Surface Warfare Center, Carderock Division, http://www.dt.navy.mil/wavelengths/archives/000050.html, printed out Jul. 5, 2006.

Gordon G. Parker, "Experimental Verification of a Command Shaping Boom Crane Control System," Proceedings of the American Control Conference, San Diego, California, Jun. 1999.

Ali H. Nayfeh and Ziyad N. Masoud, "A Supersmart Controller for Commercial Cranes," *IASC Newsletter*, International Association for Structural Control, vol. 6, No. 2, Nov. 2002, pp. 1-6 (Article appears on pp. 4-6).

Gordon G. Parker, Michael Graziano, Frank A. Leban, Jeffrey Green, and J. Dexter Bird, III, "Reducing Crane Payload Swing Using a Rider Block Tagline Control System," Oceans 2007, Aberdeen, Scotland, Jun. 18-21, 2007 (5 pages).

R. Smith, G. Starr, R. Lumia, and J. Wood, "Preshaped Trajectories for Residual Vibration Suppression in Payloads Suspended from Multiple Robot Manipulators," Proceedings of the 2004 IEEE International Conference on Robotics & Automation (ICRA), New Orleans, Louisiana, Apr. 26-May 1, 2004, vol. 2, pp. 1599-1603.

"SEICOR Teams with Real-Time Innovations for Navy's Automated Cargo Handling System: Successful at-Sea Testing of Quarter-Scale Cargo Handling System," available online on the Real-Time Innovations, Inc. (RTI) website at http://www.rti.com/company/news/seicor.html, 2 pages printed out on Sep. 1, 2009.

Frank A. Leban and Gordon G. Parker, "Future At-Sea Cargo Transfer Technology: Multiple Crane Control Case Sutdy," Proceedings of the Second Maritime Systems and Technology (MAST) Global Conference, Genoa, Italy, Nov. 14-16, 2007.

Frank A. Leban, "Coordinated Control of a Planar Dual-Crane Non-Fully Restrained System," doctoral dissertation, Naval Postgraduate School, Monterey, California, Dec. 2008, 415 pages, available online on the Defense Technical Information Center (DTIC) website at http://handle.dtic.mil/100.2/ADA493619, also available online (for purchase) from the Storming Media website at http://www.stormingmedia.us/91/9163/A916394.html.

* cited by examiner

NONPROVISIONAL PATENT APPLICATION
Navy Case No. 99,410
Coordinated Control of Two Shipboard Cranes for Cargo Transfer with Ship Motion Compensation
Frank A. Leban and Gordon G. Parker
Sheet 1 of 7

RECEIVED
OCT 07 2009
LICENSING & REVIEW

COORDINATED CONTROL OF TWO SHIPBOARD CRANES FOR CARGO TRANSFER WITH SHIP MOTION COMPENSATION

CROSS-REFERENCE TO RELATED APPLICATIONS

This application claims the benefit of U.S. provisional patent application No. 61/199,418, hereby incorporated herein by reference, filing date 7 Nov. 2008, invention title “Coordinated Control of Two Shipboard Cranes for Cargo Transfer with Ship Motion Compensation,” joint inventors Frank A. Leban and Gordon G. Parker.

BACKGROUND OF THE INVENTION

The present invention relates to cranes, more particularly to control of cranes for transferring cargo at sea so as to manage or counteract pendulation of suspended payloads.

Cranes have been used in diverse settings to effect lift-on, lift-off transfer of cargo. Various single-jib (single-boom) crane systems, both active and passive, have been considered and/or demonstrated for transferring cargo. A prevalent variety of single-jib crane is a slewing pedestal crane (also known as a rotary boom crane, or a rotary jib crane, or a luffing jib crane), which involves the suspension of a payload (load), via a hoist line (e.g., including one or more cables), from the tip of a rotatable boom (rotatable jib). Herein the terms “jib” and “boom”, are used interchangeably, and the terms “load” and “payload” are used interchangeably.

Conventional methods, devices, and algorithms for controlling slewing pedestal cranes are usually designed to avoid or minimize a fundamental problem associated with such control, namely, pendulation, which is the swinging or swaying of the payload attached to the hoist line. Pendulation generally represents a hindrance to crane operations, and tends to be exacerbated or intensified when the cargo transfer takes place in a marine environment. For instance, unmitigated pendulation that is caused by seaway disturbances to the marine vessel (e.g., ship or barge) upon which a crane is mounted may prevent the accurate placement of containers onto boats (e.g., lighters) for transport to shore.

A hoist line, together with its attached and suspended payload, constitutes a pendulum characterized by an oscillation period that may be responsive, to the point of resonance, with seaway-induced motion of the ship. This inclination toward resonance may increase with increasing length of the hoisting line, which may tend to lengthen in accordance with horizontally closer positioning of the payload to the pedestal. Generally speaking, pendulation of a crane system utilized at sea can be suppressed by (i) alleviating the ship motion (e.g., by removing or otherwise affecting the mechanism causing the ship motion), and/or (ii) altering the dynamic response of the crane system to the ship motion.

A simple type of slewing pedestal crane includes a jib (boom) and a payload hoist line. The payload hoist line extends between the tip of the jib (boom) and the payload. Control of the crane is effected in three degrees-of-freedom, viz., slew (horizontal rotational motion of the boom that results in translation of the payload in a direction transverse to the orientation of the jib), luff (vertical rotational motion of the boom that results in translation of the payload in a direction parallel to the orientation of the jib), and hoist (vertical translation of the payload).

More complicated than the simple type of slewing pedestal crane is an RBTS-equipped crane, a type of slewing pedestal crane that incorporates a Rider Block Tagline System. In basic principle, the RBTS seeks to reduce pendulation by using a rider block to reduce the length of the pendulum. The shortened pendulum has shorter oscillation periods than would the pendulum in the absence of the rider block. In effect, the RBTS thereby “detunes” the pendulum from the ship motions, which have longer oscillation periods than does the shortened pendulum.

An RBTS-equipped slewing pedestal crane includes a jib (boom), a rider block (which is situated generally intermediate the boom tip and the payload), a rider block lift line (which is attached to the rider block and extends between the boom tip and the rider block), a payload hoist line (which is reeved through the rider block and extends between the jib tip and the payload), a left tagline beam, a right tagline beam, a left tagline (which is attached to the rider block and extends between the left tagline beam end and the rider block), and a right tagline (which is attached to the rider block and extends between the right tagline beam end and the rider block). An RBTS-equipped crane is characterized by the three aforementioned degrees of freedom (slew, lull, and hoist), plus two additional degrees of freedom, viz., the vertical and horizontal positions of the rider block.

The following United States patents, each of which is incorporated herein by reference, disclose various electromechanical and/or algorithmic approaches to assisting a crane operator in controlling a slewing pedestal crane: Agostini et al. U.S. Pat. No. 7,367,464 B1 issued 6 May 2008, entitled Pendulation Control System with Active Rider Block Tagline System for Shipboard Cranes”; Nayfeh et al. U.S. Pat. No. 6,631,300 B1 issued 7 Oct. 2003, entitled “Nonlinear Active Control of Dynamical Systems”; Naud et al. U.S. Pat. No. 6,505,574 B1 issued 14 Jan. 2003, entitled “Vertical Motion Compensation for a Crane’s Load”; Robinett, III et al. U.S. Pat. No. 6,496,765 B1 issued 17 Dec. 2002, entitled “Control System and Method for Payload Control in Mobile Platform Cranes”; Jacoff et al. U.S. Pat. No. 6,444,486 B2 issued 11 Nov. 2003, entitled “System for Stabilizing and Controlling a Hoisted Load”; Jacoff et al. U.S. Pat. No. 6,439,407 B1 issued 27 Aug. 2002, entitled “System for Stabilizing and Controlling a Hoisted Load”; Robinett, III et al. U.S. Pat. No. 6,442,439 B1 issued 27 Aug. 2002, entitled “Pendulation Control System and Method for Rotary Boom Cranes”; Naud et al. U.S. Pat. No. 6,039,193 issued 21 Mar. 2000, entitled “Integrated and Automated Control of a Crane’s Rider Block Tagline System”; Overton et al. U.S. Pat. No. 5,961,563 issued 5 Oct. 1999, entitled “Anti-Sway Control for Rotating Boom Cranes”; Robinett, III et al. U.S. Pat. No. 5,908,122 issued 1 Jun. 1999, entitled “Sway Control Method and System for Rotary Boom Cranes”; Nachman et al. U.S. Pat. No. 5,089,972 issued 18 Feb. 1992, entitled “Moored Ship Motion Determination System.” See also the following papers, incorporated herein by reference: Michael J. Agostini, Gordon G. Parker, Kenneth Groom, Hanspeter Schaub and Rush D. Robinett, “Command Shaping and Closed-Loop Control Interactions for a Ship Crane,” Proceedings of the American Control Conference, Anchorage, Ak., 8-10 May 2002, pages 2298-2304; Gordon G. Parker, Michael Graziano, Frank A. Leban, Jeffrey Green, and J. Dexter Bird, III, “Reducing Crane Payload Swing Using a Rider Block Tagline Control System,” Oceans 2007, Aberdeen, Scotland, 18-21 Jun. 2007 (5 pages).

For many crane applications, a slewing pedestal crane is favored because of its considerable lifting capacity and versatility, as it is capable of handling containerized cargo as well as vehicles and other outsized objects (e.g., ramps used for discharging vehicles at a pier). Nevertheless, a single-jib crane—even a slewing pedestal crane—has its limitations in terms of size, shape, and/or weight of the load being lifted. Among crane artisans there is recognition of the basic notion that some larger (more substantial/extensive/cumbersome) loads that are difficult to handle using one crane could possibly be better accommodated by combining the efforts of two or more cranes. However, the implementation of plural cranes to lift larger loads is easier said than done, especially in marine environments.

The literature is not abundant on the subject of cargo handling using a plurality of cranes or crane-like devices. Coordinated robotic maneuvers in the absence of base motion (i.e., assuming a stationary base) are disclosed by R. Smith, G. Starr, R. Lumia, and J. Wood, "Preshaped Trajectories for Residual Vibration Suppression in Payloads Suspended from Multiple Robot Manipulators," Proceedings of the 2004 IEEE International Conference on Robotics & Automation (ICRA), New Orleans, La., 26 Apr.-1 May 2004, volume 2, pages 1599-1603, incorporated herein by reference. R. Smith et al. disclose an approach for developing swing-free motion trajectories for a dual-arm manipulator, but only in the context of a manufacturing environment, where base motion disturbances are not present.

The AutoLog (Automated Logistics) cargo handling system, recently under development by the U.S. Navy, is designed to suspend a payload from four cables. Each cable has associated therewith a computer-controlled winch, and extends from a jib supported by a fixed vertical mast. The long term goal of the AutoLog is to be capable of operating successfully in a high-sea-state environment.

The use of plural (e.g., several) cranes together to lift heavy or unwieldy loads is a recognized but rather uncommon practice. These "team lifts" are performed manually, and require the coordinated efforts of plural (e.g., several) individual operators. With respect to shipboard cranes, such team-lift operations have been successfully conducted with experienced operators and in very benign environmental conditions, but would not be attempted when significant ship motions are present.

SUMMARY OF THE INVENTION

In view of the foregoing, an object of the present invention is to provide an efficient methodology for jointly using two slewing pedestal cranes to perform lifting operations in a marine environment characterized by base motion disturbances.

The present inventors have considered the dynamic behavior of team-lift crane operations, and have conceived the present invention's plural-crane control scheme, which typically results in small payload swing in the presence of base motion disturbances. The present invention is frequently embodied as a method, an apparatus, or a computer program product for exerting two-crane control, i.e., for controlling dual cranes.

The present invention, as typically practiced, exerts active control with respect to plural cranes situated onboard the same marine vessel. The inventive active control facilitates joint lifting by the cranes, and is sustained on a continual basis during the joint lifting of a load. Geometric parameters of the cranes, and motion of the marine vessel, are sensed. Using the sensed geometric parameters of the cranes and the sensed motion of the marine vessel, solutions for the geometric parameters of the cranes are determined to approximate static equilibrium of the load. The geometric parameters of the cranes are adjusted in accordance with the determined solutions.

The present invention is frequently practiced in association with two cranes so as to coordinate their cooperative performance of a lift. According to typical inventive practice of two-crane control, the geometric parameters include luff angle and hoist line length of each crane—e.g., the first crane's luff angle $\beta_1$ the first crane's hoist line length $L_{h1}$, the second crane's luff angle $\beta_2$, and the second crane's hoist line length $L_{h2}$. The solutions are determined in accordance with the following equation:

$$\begin{Bmatrix} \dot{L}_{h1} \\ \dot{L}_{h2} \\ \dot{\beta}_1 \\ \dot{\beta}_2 \end{Bmatrix} = W^{-1}A^T(AW^{-1}A^T)^{-1}\vec{y}.$$

Uniquely featured by typical two-crane embodiments of the present invention is the use of two cranes in concert to "detune" the two-crane system's natural frequency from the base motion excitation. Typical inventive two-crane practice is for controlling a pair of luffing jib cranes of the "simple" kind (i.e., a crane having a jib and a hoist line, but lacking a rider block). Inventive control performs active ship motion compensation by continually adjusting the hoist line length and the boom (jib) angle of each of the two cranes. Otherwise expressed, the present invention continually adjusts the two-crane system for the constantly moving base (e.g., ship). Nevertheless, inventive practice can lead to baseline control strategies, and can extend to RBTS-equipped luffing jib cranes, or to two-dimensional plural-crane systems of three cranes or more, or even to three-dimensional plural-crane systems.

The present invention as frequently practiced is based on analysis of a two-dimensional (planar) two-crane scenario, wherein both cranes are luffing jib cranes of the simple kind. According to the inventive "two-dimensional" analytical basis, all three components of payload motion that are sought to be minimized—viz., linear motion along the x-axis (in-plane horizontal), linear motion along the z-axis (in-plane vertical), and rotational motion about the y-axis (through-plane horizontal)—lie in the same vertical geometric plane. According to this inventive analytical approach, out-of-plane forms of payload motion (e.g., linear motion along the y-axis, rotational motion about the x-axis, rotational motion about the z-axis) are disregarded.

The present invention's active motion compensation for plural/multiple crane lifts is potentially useful in both the military and the commercial sectors. For instance, the inventive capability to deploy large structures (e.g., vehicle discharge ramps or barge sections) from a marine vessel, while underway or at anchor, could support current and future sustainment paradigms for military expeditionary operations.

Some aspects of the present invention are disclosed by the following documents, each of which is incorporated herein by reference: Frank A. Leban and Gordon G. Parker, "Future At-Sea Cargo Transfer Technology: Multiple Crane Control Case Study," Proceedings of the Second Maritime Systems and Technology (MAST) Global Conference, Genoa, Italy, 14-16 Nov. 2007; Frank A. Leban, "Coordinated Control of a Planar Dual-Crane Non-Fully Restrained System," doctoral dissertation, Naval Postgraduate School, Monterey, Calif., December 2008, 415 pages, available online on the Defense Technical Information Center (DTIC) website, also available online (for purchase) from the Storming Media website.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 4 shows the ship's surge over time, FIG. 5 shows the ship's heave over time, and FIG. 6 shows the ship's pitch over time.

In FIG. 7: the lighter (upper) solid line represents inventively actuated motions of the left (first) jib when inventive control is "on"; the darker (lower) solid line represents inventively actuated motions of the right (second) jib when inventive control is "on"; the dashed line represents inventively actuated motions of either jib when inventive control is "off. " In FIG. 8: the lighter (upper) solid line represents inventively actuated motions of the left (first) hoist when inventive control is "on"; the darker (lower) solid line represents inventively actuated motions of the right (second) hoist when inventive control is "on"; the dashed line represents inventively actuated motions of either hoist when inventive control is "off."

FIG. 9 shows payload motion in the linear direction of the x-axis. FIG. 10 shows payload motion in the linear direction of the z-axis. FIG. 11 shows payload motion in the rotational direction about the y-axis, wherein $\theta_p$ is the payload's absolute rotation angle.

DETAILED DESCRIPTION OF THE INVENTION

Figure 1:
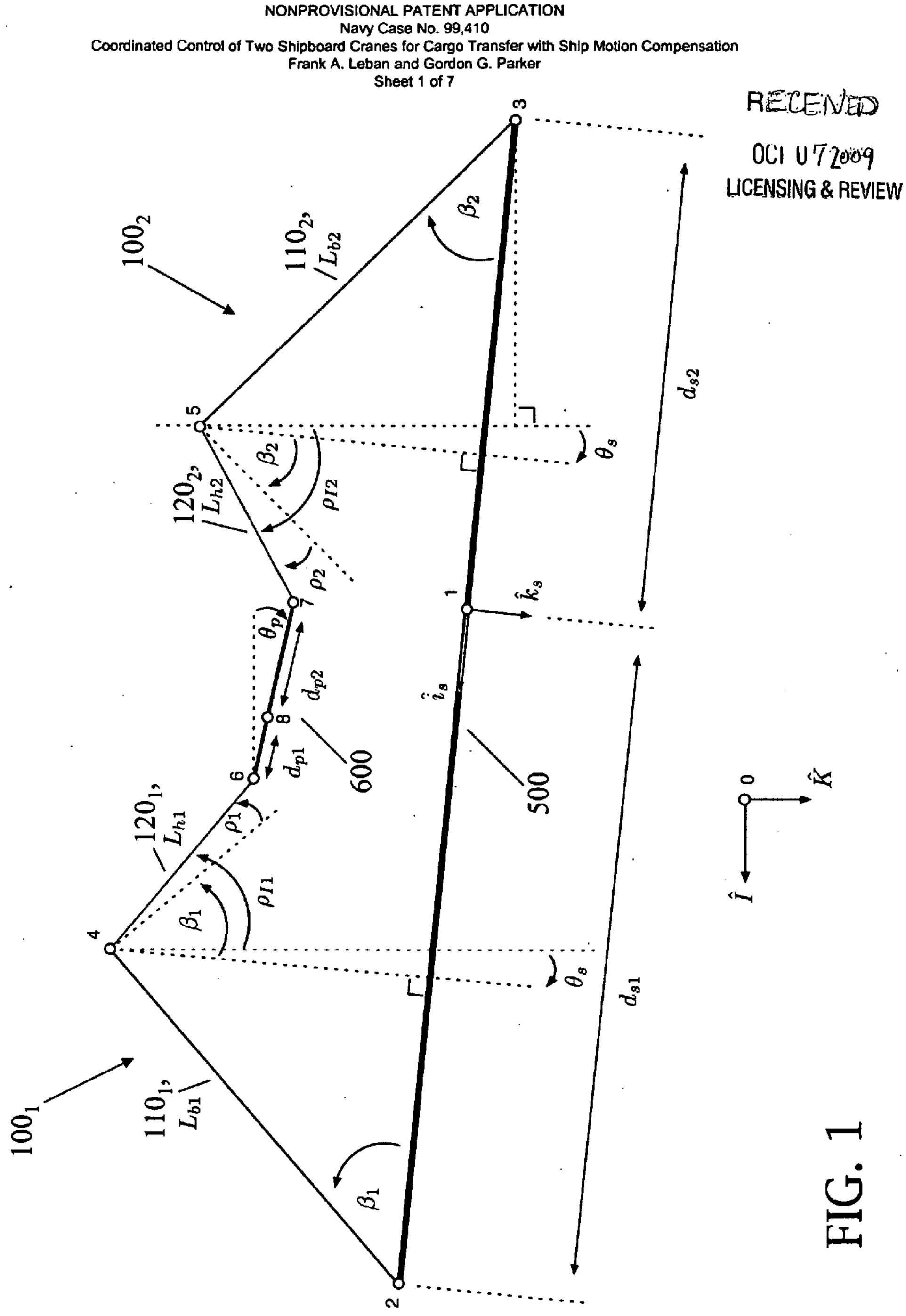
FIG. 1 is a diagram of a planar two-crane system, the diagram illustrating coordinate systems/frames and dimension names/notations for deriving two-crane dynamic equations and designing two-crane system control in accordance with the present invention.

Reference is now made to FIG. 1, which is a planar representation of a system of two luffing jib cranes. According to typical inventive practice, the paired cranes are equivalent or comparable to each other. Each crane includes a jib (boom) and a hoist line. The first crane, viz., crane 100$_1$, includes jib 110$_1$ (segment 2-4, having jib length $L_{b1}$) and hoist line 120$_1$ (segment 4-6, having hoist line length $L_{h1}$). The second crane, viz., crane 100$_2$, includes jib 110$_2$ (segment 3-5, having jib length $L_{b2}$) and hoist line 120$_2$ (segment 5-7, having hoist line length $L_{h2}$).

The two jibs 110$_1$ and 110$_2$ are attached to the moving base 500 (segment 2-1-3), e.g., the ship deck, which can translate and rotate relative to an inertial frame. Jibs 110$_1$ and 110$_2$ support a single rigid-body payload 900 (segment 6-8-7), suspended by hoist lines 120$_1$ and 120$_2$.

The origin of the ship-fixed reference frame {s} is at point 1, which is assumed to lie on the line connecting points 2 and 3, the respective hinge points of the crane jibs 110$_1$ and 110$_2$. For crane 100$_1$, $\beta_1$ is the angle of the first crane's jib 110$_1$ relative to the deck 500. For crane 100$_2$, $\beta_2$ is the angle of the second crane's jib 110$_2$ relative to the deck 500.

The inertial reference frame {I} is located at point 0, with the unit vectors $\hat{I}$, $\hat{J}$, and $\hat{K}$ forming a right-hand coordinate system, where the superscript caret symbol ^ is used to denote unit vectors. The position vector from the origin of the inertial frame to point 0 is $\vec{p}_8$. Relative position vectors are denoted using a two-point subscript. For example, the vector from point 1 to point 8 is $\vec{p}_{8/1}$.

The ship-fixed reference frame {s} is defined by the unit vectors $\hat{i}_s$ and $\hat{k}_s$. In addition to translating in the plane, the ship can rotate relative to {I} by the angle $\theta_s$. Similarly, the unit vectors $\hat{j}_p$ and $\hat{k}_p$ are fixed to the payload center of mass, and define the payload-fixed reference frame {p}. Angle $\theta_p$ is the rotation of {p} relative to {I}, and is the absolute rotation angle of the payload 600.

Shown in FIG. 1 are two swing angles that are used for each crane in the present invention's equations of motion derivation and the present invention's inverse kinematic control derivation. Angle $\rho_1$ is the swing angle of the first crane's hoist line 120$_1$ relative to jib 110$_1$. Angle $\rho_2$ is the swing angle of the second crane's hoist line 120$_2$ relative to jib 110$_2$. Angle $\rho_{11}$ is the swing angle of the first crane's hoist line 120$_1$ relative to {I}. Angle $\rho_{12}$ is the swing angle of the second crane's hoist line 120$_2$ relative to {I}.

The present inventors developed the formulations of their equations of motion using Newton's Second Law of Motion, with a view toward creating a numerical simulation. Three generalized coordinates are used in these inventive derivations, viz., the $\hat{i}$ and $\hat{k}$ components of the relative position vector $\vec{p}_{8/1}$, and the absolute payload rotation angle $\theta_p$. Two constraint equations are employed, consistent with the fact that the two-crane system shown in FIG. 1 has one degree of freedom.

Figure 2:
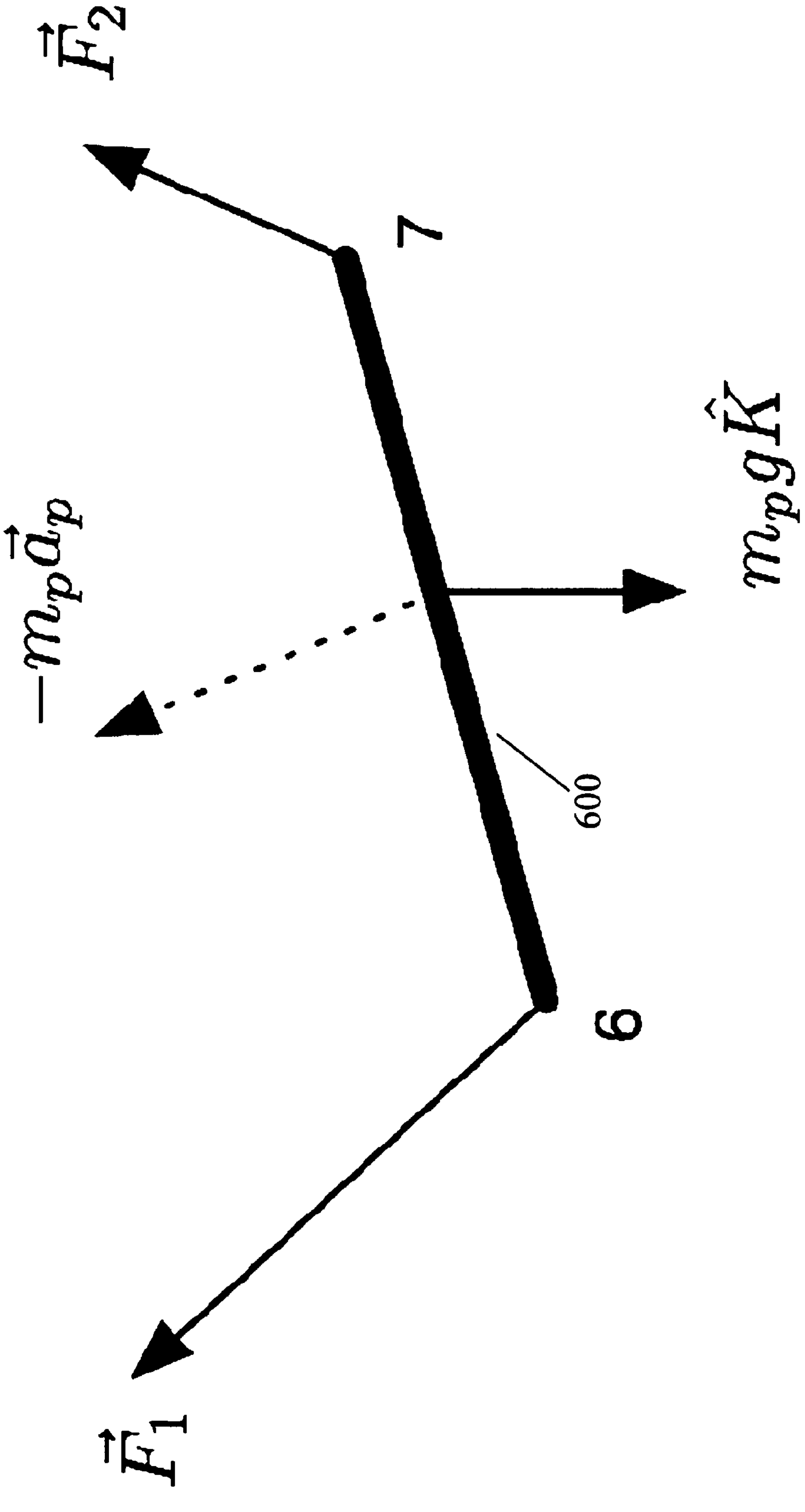
FIG. 2 is a free-body diagram of a payload, the diagram illustrating constraint forces for deriving the present invention's above-noted two-crane dynamic equations.

Reference is now made to FIG. 2, which is a free-body diagram of the payload 600. The forces acting on the payload 600 include the two hoist line (e.g., cable) tensions, $\vec{F}_1$ and $\vec{F}_2$, and the weight of the payload 500, $m_p\vec{g}$, where is the gravitational acceleration vector. $\vec{F}_1$ is the tension on hoist line 120$_1$, and $F_2$ is the tension on hoist line 120$_2$. The absolute acceleration of the center of mass is denoted $\vec{a}_p$.

The goal of the present invention's control strategy, as typically practiced, is to keep the payload 600 in static equilibrium. For static equilibrium, the sum of all external forces acting on the load 600 must be zero. As elaborated upon hereinbelow, force and moment balance equations are formed in terms of (i) the swing angles defined relative to the inertial frame and the orientation of the load 600, as shown in FIG. 1; and, (ii) the forces on the load 600, as shown in FIG. 2. Their time derivatives are taken, and unknown forces are resolved out. The resultant constraint equation, Equation (10), is linear in the inertial swing angle rates, and is nonlinear in the inertial swing angles and load orientation.

Applying Newton's Second Law to the free-body diagram of FIG. 2 gives Equation (1):

$$\vec{F}_p=m_p\vec{a}_8=m_p\vec{g}+\vec{F}_1+\vec{F}_2$$

where $$\vec{F}_1=\vec{F}_1\hat{P}_{4/6}$$

$$\vec{F}_2=F_2\hat{P}_{3/7} \quad (2)$$

The absolute acceleration of the center of mass, $\vec{a}_8$, is found by first defining its absolute position vector as set forth in Equation (3):

$$\vec{p}_8=\vec{p}_1+\vec{p}_{8/1} \quad (3)$$

and then taking two absolute derivatives as shown in Equation (4):

$$\vec{a}_8=\vec{a}_1+\ddot{\vec{p}}_{8/1}+2\vec{\omega}_s\times\dot{\vec{p}}_{8/1}+\vec{\omega}_s\times(\vec{\omega}_s\times\vec{p}_{8/1})+\vec{\alpha}_s\times\vec{p}_{8/1} \quad (4)$$

where $\vec{a}_1$ is the absolute acceleration of the origin of {s}, and where $\vec{\omega}_s$ and $\vec{\alpha}_s$ are the absolute angular velocity and angular acceleration, respectively, of {s}. The notation $\ddot{\vec{p}}_{8/1}$ implies time derivatives of the components of the vector $\vec{p}_{8/1}$ represented in a rotating coordinate frame.

Euler's Equation is used here to describe the rotational motion of the load, relating the applied moments to the rotational acceleration of the rigid body. Since the system is planar, only the $\hat{j}$ component is needed. Thus, Euler's Equation is given by Equation (5):

$$\vec{M}\cdot\hat{j}=J_p\cdot\ddot{\theta}_p \quad (5)$$

where $J_p$ is the y-component of the mass moment of inertia of the load about its center of mass. It should be noted that the use of $\hat{j}$ in the dot product of Equation (5) is not ambiguous, since all of the frames used in FIG. 1 have the same y-axis definition. The general expression for the externally applied moments can be written in terms of the applied hoist line forces, $\vec{F}_1$ and $\vec{F}_2$, as shown in Equations (6):

$$\begin{aligned}\vec{M}&=\vec{p}_{6/8}\times\vec{F}_1+\vec{p}_{7/8}\times\vec{F}_2\\&=F_1(\vec{p}_{6/8}\times\vec{p}_{4/6})+F_2(\vec{p}_{7/8}\times\vec{p}_{5/7})\end{aligned} \quad (6)$$

To summarize, the present invention's three dynamic equations are given by Equations (7):

$$m_p[\vec{a}_1+\ddot{\vec{p}}_{8/1}+2\vec{\omega}\times\dot{\vec{p}}_{8/1}+\vec{\omega}_s\times(\vec{\omega}_s\times\vec{p}_{8/1})]=m_p\vec{g}+F_1\hat{p}_{4/6}+F_2\hat{p}_{5/7}$$

$$J_p\ddot{\phi}_p=[\vec{p}_{6/8}\times\vec{F}_1+\vec{p}_{7/8}\times\vec{F}_2+F_1(\vec{p}_{6/8}\times\vec{p}_{4/6})+F_2(\vec{p}_{7/8}\times\vec{p}_{5/7})]\cdot\hat{j} \quad (7)$$

It should be noted that all the quantities of Equations (7)—e.g., $\vec{a}_1$, $\vec{\omega}_s$, $\vec{\alpha}_s$—are known time histories, except for the three generalized coordinates, $\vec{p}_{8/1}$ and $\phi$, and the two line force amplitudes, $F_1$ and $F_2$.

Two independent constraint equations can be formed in a variety of ways, including those represented by Equations (8):

$$\|\vec{p}_{4/6}\|^2=L_{h1}^2$$

$$\|\vec{p}_{5/7}\|^2=L_{h2}^2 \quad (8)$$

Combining the three dynamic Equations (7) and the second derivatives of the constraint Equations (8) creates a set of five equations that can be solved at each time step of a simulation to compute generalized coordinate second derivatives and constraint forces. The generalized coordinate accelerations can then be integrated to compute the relative load position time histories. As further described hereinbelow, the present inventors used this approach in constructing a simulation in MATLAB Simulink to evaluate an embodiment of the present invention's inverse kinematic control system.

Essentially, the objective of the present invention's inverse kinematic controller is to use the respective actuation capabilities of the plural (e.g., two) cranes to keep the load fixed in inertial space. The mode of inventive practice that is described herein with reference to the figures is that of planarity with respect to two simple cranes two simple cranes analyzed in two dimensions. The objective of this inventive mode is to use the respective actuation capabilities of first crane 100$_1$ and second crane 100$_2$—viz., crane 100$_1$'s hoist line length $L_{h1}$, crane 100$_2$'s hoist line length $L_{h2}$, crane 100$_1$'s rotation angle $\beta_1$, and crane 100$_2$'s rotation angle $\beta_2$—to keep the load 500 fixed in inertial space. Thus, the load's two center-of-mass coordinates, and its absolute orientation, should experience zero time rate-of-change, even if (s) has motion.

With regard to the present invention's force constraints, the sum of all of the external forces acting on the load must be zero, since the inventive control strategy seeks to keep the load in static equilibrium. Force and moment balance equations are given in Equations (9):

$$-F_1\cos\rho_{l1}-F_2\cos\rho_{l2}+mg=0$$

$$F_1\sin\rho_{l1}-F_2\sin\rho_{l2}=0$$

$$d_1F_1\cos(\theta_p+\rho_{l1})-d_2F_2\cos(\theta-\rho_{l2})=0 \quad (9)$$

The unknown force amplitudes, $F_1$ and $F_2$, can be resolved out of Equations (9), resulting in a single equation in $\theta_p$, $\rho_{l1}$, and $\rho_{l2}$. Taking its derivative, and imposing the desired condition that $\dot{\theta}_p=0$, results in a force constraints equation of the form shown in Equation (10):

$$J_1(\rho_{l1},\rho_{l2},\theta_p)\cdot\dot{\rho}_{l1}+J_2(\rho_{l1},\rho_{l2},\theta_p)\cdot\dot{\rho}_{l2}=0 \quad (10)$$

where $J_1$ and $J_2$ are rather lengthy nonlinear functions.

As further explained hereinbelow, two vector loops are used to form the kinematic constraint equations. Their forms are given by Equations 11, where r is a 3 vector that depends on the crane geometry and does not contain $\dot{L}_{h1}$, $\dot{L}_{h2}$, $\dot{\beta}_1$, and $\dot{\beta}_2$. The matrix A is a 3×4 Jacobian, also a function of the crane geometry.

Two vector loops can be formed that capture the kinematic constraints of the system, and are given in Equations (11):

$$\vec{p}_1+\vec{p}_{2/1}+\vec{p}_{4/2}+\vec{p}_{6/4}+\vec{p}_{8/6}=\vec{p}_8$$

$$\vec{p}_1+\vec{p}_{3/1}+\vec{p}_{5/3}+\vec{p}_{7/5}+\vec{p}_{8/7}=\vec{p}_8 \quad (11)$$

Taking the x and z components of Equations (11) gives four constraint equations, viz., Equations (12):

$$x_1+d_{s1}\cos(\theta)-L_{b1}\cos(\beta_1-\theta)-L_{h1}\sin(\rho_{l1})-d_{p1}\cos(\theta_p)-x_8=0$$

$$z_2-d_{s1}\sin(\theta)-L_{b1}\sin(\beta_1-\theta)+L_{h1}\cos(\rho_{l1})+d_{p1}\sin(\theta_p)-z_8=0$$

$$x_1-d_{s2}\cos(\theta)+L_{b2}\cos(\beta_2+\theta)+L_{h2}\sin(\rho_{l2})+d_{p2}\cos(\theta_p)-x_8=0$$

$$z_1+d_{s2}\sin(\theta)-L_{b2}\sin(\beta_2+\theta)+L_{h2}\cos(\rho_{l2})-d_{p2}\sin(\theta_p)-z_8=0 \quad (12)$$

Taking the time derivatives of the first and third equations of Equations (12), solving them for $\dot{\rho}_{l1}$ and $\dot{\rho}_{l2}$, and substituting them into Equation (10) and the second and fourth equations of Equations (12), yields three linear equations in the four unknowns, namely, $\dot{L}_{h1}$, $\dot{L}_{h2}$, $\dot{\beta}_1$, and $\dot{\beta}_2$. These are shown generically in Equation (13), where A is a 3×4 Jacobian, and $\vec{y}$ is a 3×1 vector of all of the terms of the constraint equations that do not contain $\dot{L}_{h1}$, $\dot{L}_{h2}$, $\dot{\beta}_1$, and $\dot{\beta}_2$:

$$\vec{y} = A\begin{Bmatrix} \dot{L}_{h1} \\ \dot{L}_{h2} \\ \dot{\beta}_1 \\ \dot{\beta}_2 \end{Bmatrix} \tag{13}$$

The present invention's solution of the planar two-crane inverse kinematics problem is underdetermined. According to this "x-z planar mode" of inventive practice, two simple slewing pedestal crane cranes are inventively controlled. The inventive kinematic aim establishes three payload kinematic (movement) constraint conditions (zero x-motion; zero z-motion; zero x-z planar rotation), while the inventive control of the two cranes provides four command inputs (two inputs in luff; two inputs in hoist).

The minimum norm solution for the present invention's crane-rate commands is shown in Equation (14):

$$\begin{Bmatrix} \dot{L}_{h1} \\ \dot{L}_{h2} \\ \dot{\beta}_1 \\ \dot{\beta}_2 \end{Bmatrix} = W^{-1}A^T(AW^{-1}A^T)^{-1}\vec{y} \tag{14}$$

where W is a 4×4 weighting matrix that can be used to shift the speed effort between the available crane assets.

According to typical inventive practice, a combination of kinematic constraints and force constraints needs to be ensured. As discussed hereinabove, according to typical practice of the inventive mode that is planar (two-dimensional) with respect to two simple slewing pedestal cranes, there are three kinematic constraint conditions (zero x-motion of the load; zero z-motion of the load; zero x-z planar rotation of the load), and four crane inputs (two inputs in lull; two inputs in hoist). The resultant linear system of three undetermined equations and four unknowns has an infinite set of solutions. The weighted, minimum norm solution of Equation (14) exemplifies one type of solution, and is used by way of example in the inventive simulation results described hereinbelow. As alternatives to three kinematic constraint conditions and four crane inputs, inventive principle permits practice of this inventive mode (planarity of two simple slewing pedestal cranes) so that fewer than three kinematic constraint conditions are imposed and/or fewer than four crane inputs are rendered.

It will be appreciated by the ordinarily skilled artisan who reads the instant disclosure that the present invention can be embodied so as to involve any of various mathematical methods for solving the present invention's crane inputs. The present invention's dual-crane solution is described herein by way of example to implement the mathematical method known as the "minimum norm method."

The ordinarily skilled artisan who reads the instant disclosure and is familiar with the form of the minimum norm solution will recognize that inventive practice permits the arbitrary selection of W. The inclusion of the weighting matrix, W as shown in Equation (14), allows for inventive practice whereby the selection of W is arbitrary, subject to the mathematical necessity that it be symmetric and invertible, e.g., that $W^{-1}$ also exists. For instance, the most intuitive form of W is a diagonal matrix, with the elements represented by $W_{11}$, $W_{22}$, $W_{33}$, and $W_{44}$. A simple and acceptable form is to select $W_{11}=W_{22}=W_{33}=W_{44}=1$ so that W is equal to the identity matrix. This selection is representative of the case where the inventive dual-crane system includes cranes of identical capability, and the luffing and hoisting actuation efforts are shared equally.

The ordinarily skilled artisan who reads the instant disclosure and is familiar with the form of the minimum norm solution will also recognize that, in practicing the present invention, different values can be selected for W. For instance, choosing large values for some elements of W, relative to others, will cause that actuation rate to be diminished or "penalized" for contributing in the solution. According to some inventive embodiments, it may be operationally significant to have the capability to control the relative efforts between the luffing and hoisting actuations. The contributions of the four actuations in the present invention's inverse kinematic motion compensation can be selectively tailored in this manner. One potential application of this inventive approach would be to reduce the contribution of an actuator when in proximity to a physical limit (e.g., minimum/maximum jib angle or minimum/maximum hoist length), to avoid driving the actuator into a condition that would cause the crane to be incapable of following the command signal. Another potential application of this inventive approach would be to afford fault tolerance. Coupled with a machinery diagnostic system, the elements of the weighting matrix could be changed appropriately upon detection of a fault or reduced performance of one of the actuators, so that crane operations would not be interrupted.

For a more complete description, including simulation results, of the influence of the structure of the weighting matrix on the character of the solution of the inventive dual-crane system, see the aforementioned dissertation by joint inventor Frank A. Leban entitled "Coordinated Control of a Planar Dual-Crane Non-Fully Restrained System."

It will be further appreciated by the ordinarily skilled artisan who reads the instant disclosure that other modes of inventive practice, both planar (two-dimensional) and non-planar (three-dimensional), are possible. For instance, according to a non-planar mode of inventive practice with respect to two simple slewing pedestal cranes, there can be up to six kinematic constraint conditions (zero x-motion of the load; zero y-motion of the load; zero z-motion of the load; zero x-y planar rotation of the load; zero y-z planar rotation of the load; zero x-z planar rotation of the load), and six crane inputs (two inputs in luff; two inputs in hoist; two inputs in slew). Fewer than six kinematic constraint conditions and/or fewer than four crane inputs can be effectuated. For example, instead of six kinematic constraint conditions, there can be five kinematic constraint conditions, whereby y-z planar rotation of the load (axial roll of the load) is disregarded. According to modes of inventive practice with respect to RBTS-equipped slewing pedestal cranes, the rider blocks create even larger dimensional underdetermined systems, vis-à-vis modes of inventive practice with respect to simple slewing pedestal cranes.

With reference to FIG. 3 through FIG. 11, now described herein is a simulated example of the present invention's inverse kinematic control. This simulation was produced by the present inventors, and serves to demonstrate the efficacy of the present invention. Two cranes, viz., crane $\mathbf{100}_1$ and crane $\mathbf{100}_2$, are initialized in the configuration depicted in FIG. 3.

Figure 3:
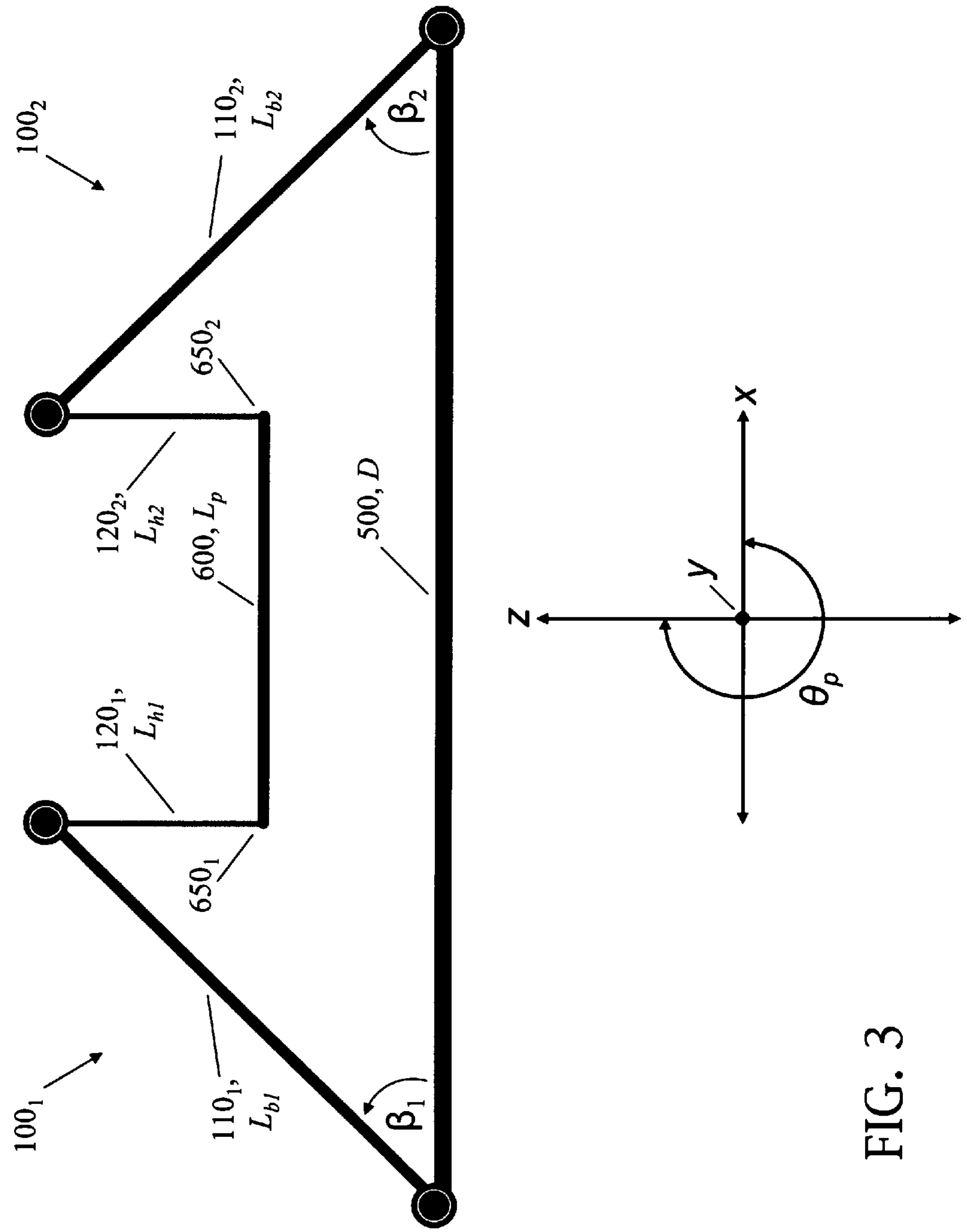
FIG. 3 is a diagram of an initial two-crane configuration for modeling, by way of example, inverse kinematic control in accordance with the present invention.

As shown in FIG. 3, crane $\mathbf{100}_1$ includes jib $\mathbf{110}_1$ and hoist line $\mathbf{120}_1$, and is characterized by a jib $\mathbf{110}_1$ angle $\beta_1$, a jib length $L_{b1}$, and a hoist line length $L_{h1}$. Crane $\mathbf{100}_2$ includes jib $\mathbf{110}_2$ and hoist line $\mathbf{120}_2$, and is characterized by a jib $\mathbf{110}_2$ angle $\beta_2$, a jib length $L_{b2}$, and a hoist line length $L_{h2}$. The distance $D_{b-b}$ between the respective pins (e.g., of lull pivoting devices such as $\mathbf{401}_1$ and $\mathbf{401}_2$ shown in FIG. 12) of jibs $\mathbf{110}_1$ and $\mathbf{110}_2$ is 72 meters. Jibs $\mathbf{110}_1$ and $\mathbf{110}_2$ are each 33.94 meters in length. The jib angles $\beta_1$ and $\beta_2$ are each initially set to 45°. The hoist line lengths $L_{h1}$ and $L_{h2}$ are each initially set to 12 meters. Hoist lines $\mathbf{120}_1$ and $\mathbf{120}_2$ are connected at opposite longitudinal ends of payload 600, which has a total payload length $L_P$ of 24 meters. For purposes of this example, payload length $L_P$ approximately equals the distance between the respective attachment points $\mathbf{450}_1$ and $\mathbf{450}_2$ of hoist lines $\mathbf{120}_1$ and $\mathbf{120}_2$ with respect to payload 600. As a result of this configuration of cranes $\mathbf{100}_1$ and $\mathbf{100}_2$, the origin of {s} lies directly below the origin of {p}. The origin of {I} is initially placed at the origin of {s}.

Figure 4:
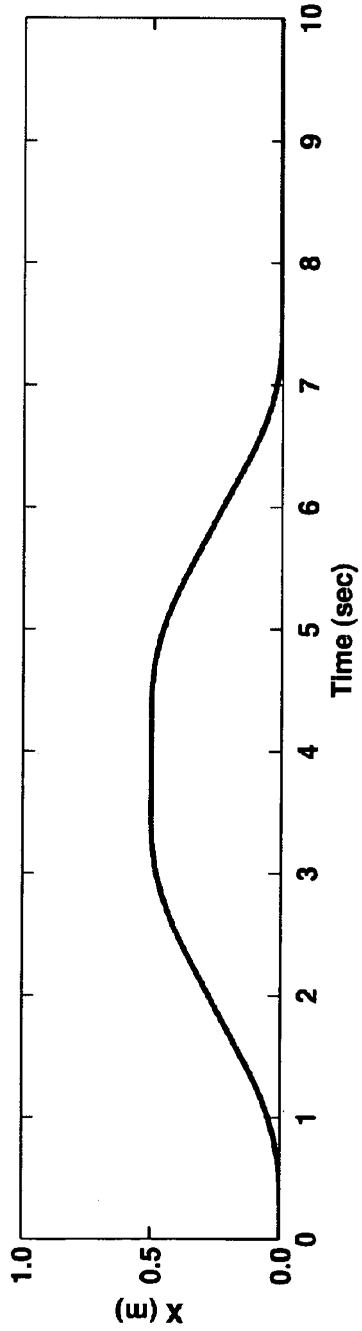
FIG. 4 through FIG. 6 are time history graphs of ship motions.
Figure 5:
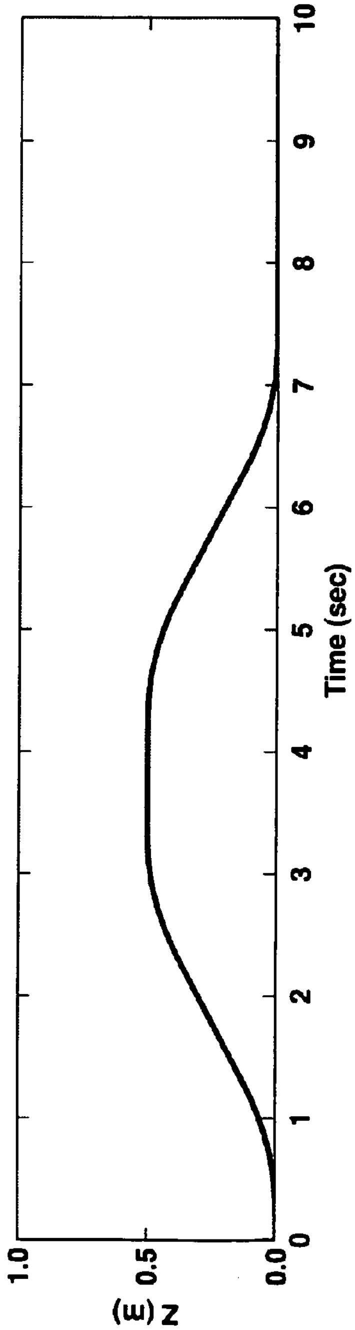
Figure 6:
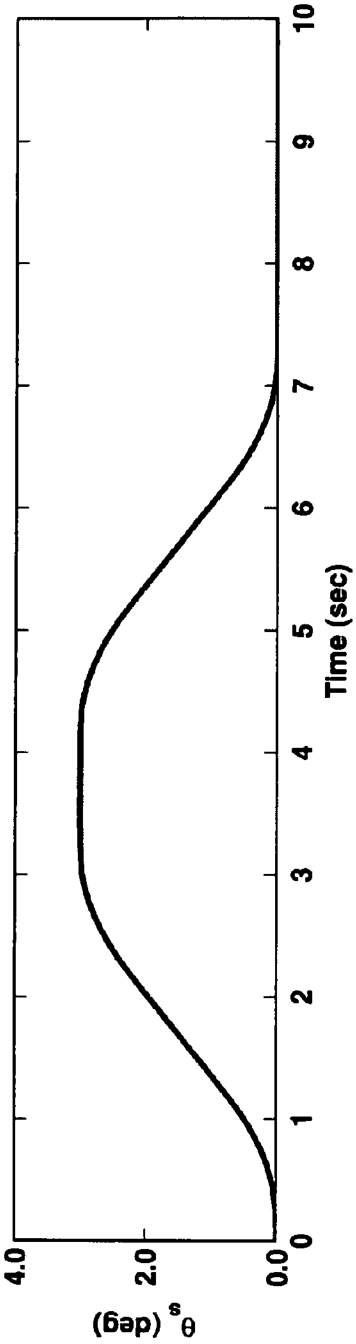

The ship motion for the simulation is illustrated FIG. 4 through FIG. 6. In the simulation, two cases are effectuated that use the identical ship motion. According to the first case, referred to as "control off" in FIG. 7 through FIG. 11, no inventive commands are sent to either crane; that is, neither the first crane's jib drive, nor the first crane's hoist drive, nor the second crane's jib drive, nor the second crane's hoist drive, receives any commands carrying out the present invention's two-crane control strategy. According to the second case, referred to as "control on" in FIG. 7 through FIG. 11, inventive commands are sent to both cranes; that is, the first crane's jib and hoist drives, and the second crane's jib and hoist drives, all receive commands carrying out the present invention's two-crane control strategy.

A diagonal minimum norm weighting matrix is used for Equation). The elements corresponding to the hoist are set to 1, and the elements corresponding to luff are set to 100. Selection of these values for the weights provided a rough balance between the hoist and luff rates computed by the minimum norm solution.

Figure 7:
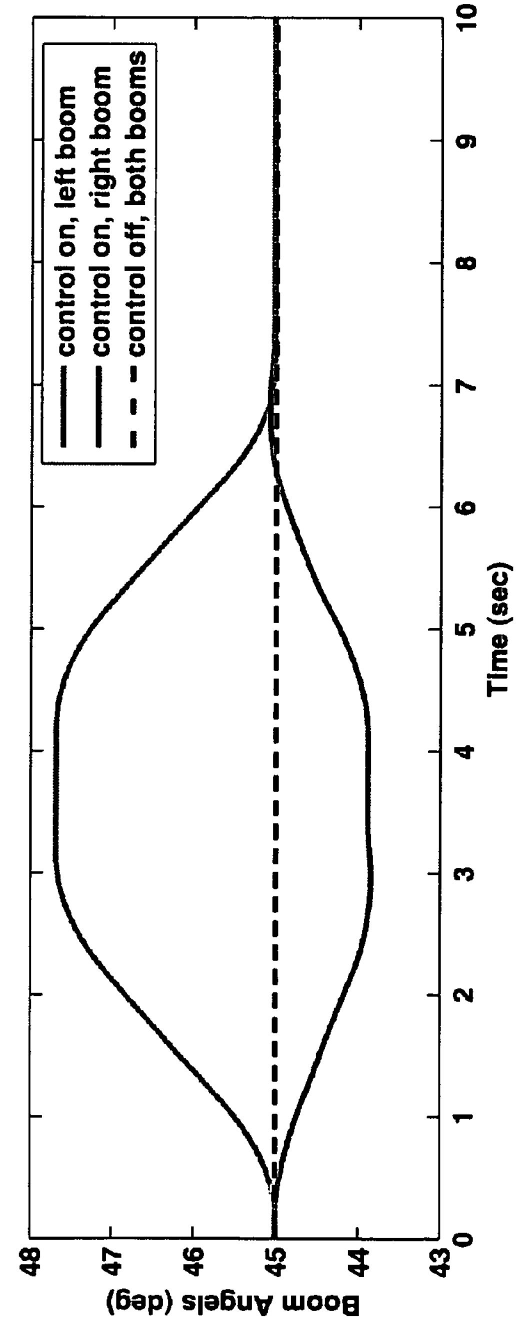
FIG. 7 and FIG. 8 are time history graphs of crane jib motions (FIG. 7) and crane hoist motions (FIG. 8).
Figure 8:
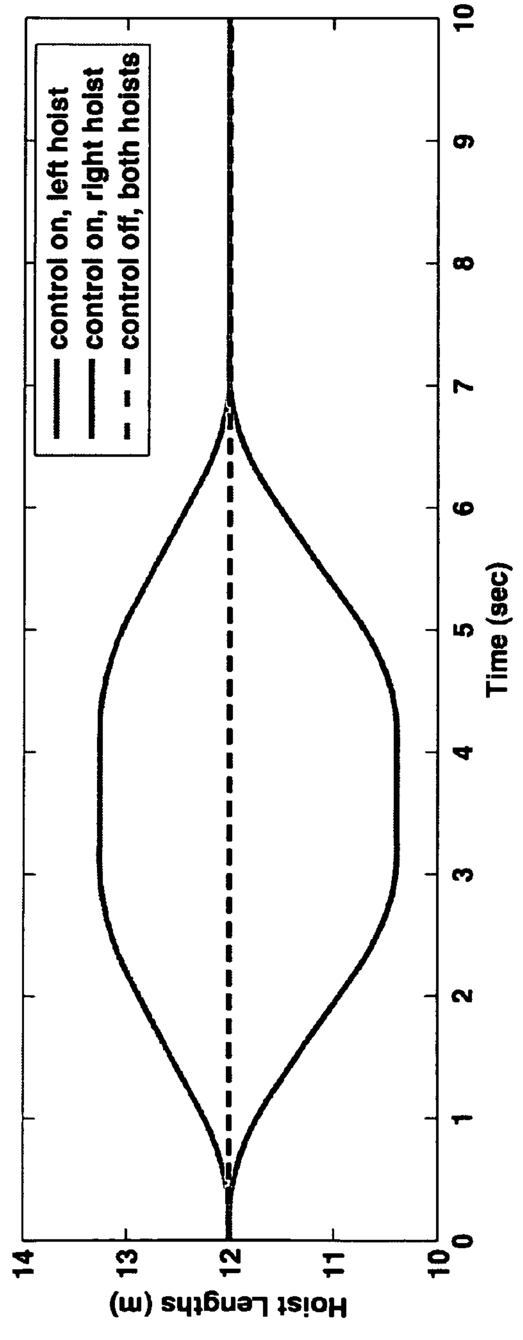
Figure 9:
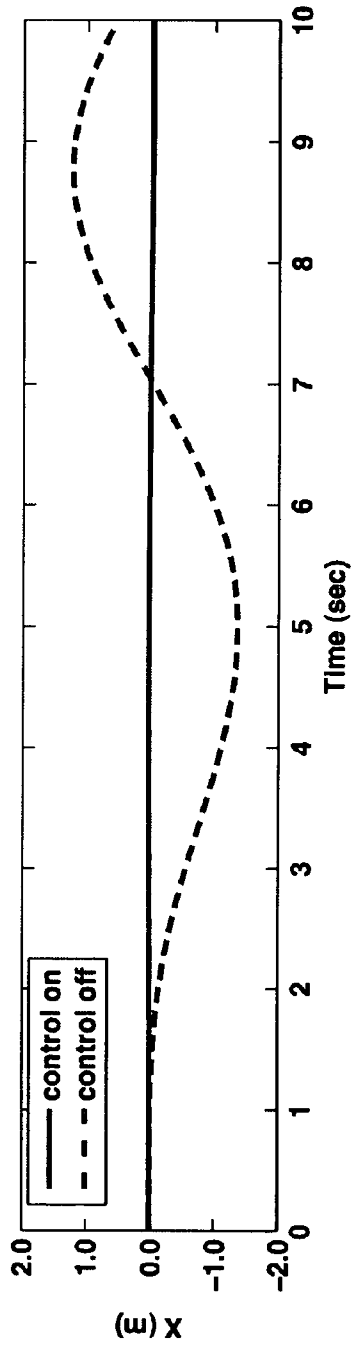
FIG. 9 through FIG. 11 are graphs of inertial motion of the payload, each graph showing payload motion with the inventive control on (solid line) and with the inventive control off (dashed line).
Figure 10:
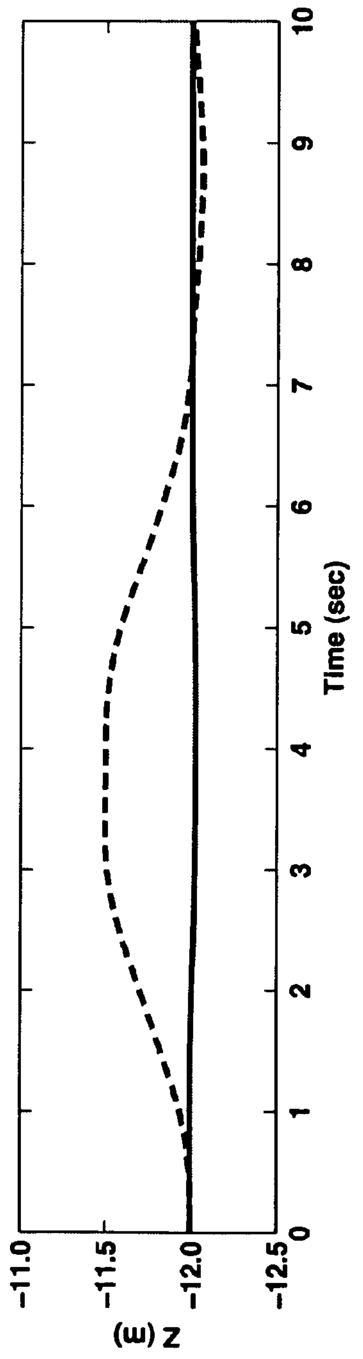
Figure 11:
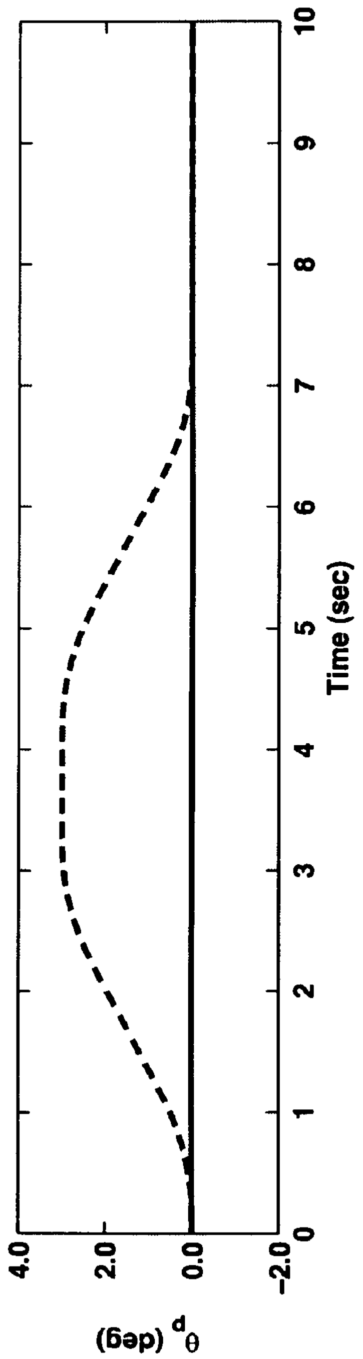

The time is the same along the horizontal axis of each graph (FIG. 4 through FIG. 11). The ship motion time history consists of simultaneous surge, heave, and pitch, as shown in FIG. 4 through FIG. 6. The resulting crane jib and hoist motions are shown in FIG. 7 and FIG. 8, and the resulting inertial load motions are shown in FIG. 9 through FIG. 11.

This simulation clearly demonstrates that in the "control on" case, the load is kept fixed in inertial space, and thus there is no payload swing during or after the maneuver. This is in contrast to the "control off" case, where significant x-motion of the payload persists after the maneuver is finished. This residual motion has no rotation component, since the load endpoints are located directly below the boom tips.

The present invention's implementation of the mathematical method known as the "minimum norm method" is described herein by way of example, and may require certain characteristics of the cranes to which such inventive embodiments are applied. For instance, for inventive control of two cranes, each crane's effort would need to be distributed in such a manor as to prevent the booms from lowering too close to the load attachment point, and from raising beyond vertical. Furthermore, the condition of balancing drive speeds, which results from inventively employing the minimum norm method, perhaps should be modified to minimize a more practical quantity. For example, the minimum cable tension solution is to keep the boom tips directly over the load endpoints; while this is attractive from a structural loading perspective, it may limit the usefulness of the two-crane scenario. Perhaps minimum power would be a better metric, possibly resulting in a different inverse kinematic solution. Active damping is an additional aspect of the overall crane control, and perhaps should also be addressed. It appears likely that the active damping solution would also be underdetermined, and might also benefit from a power-optimal solution.

Figure 12:
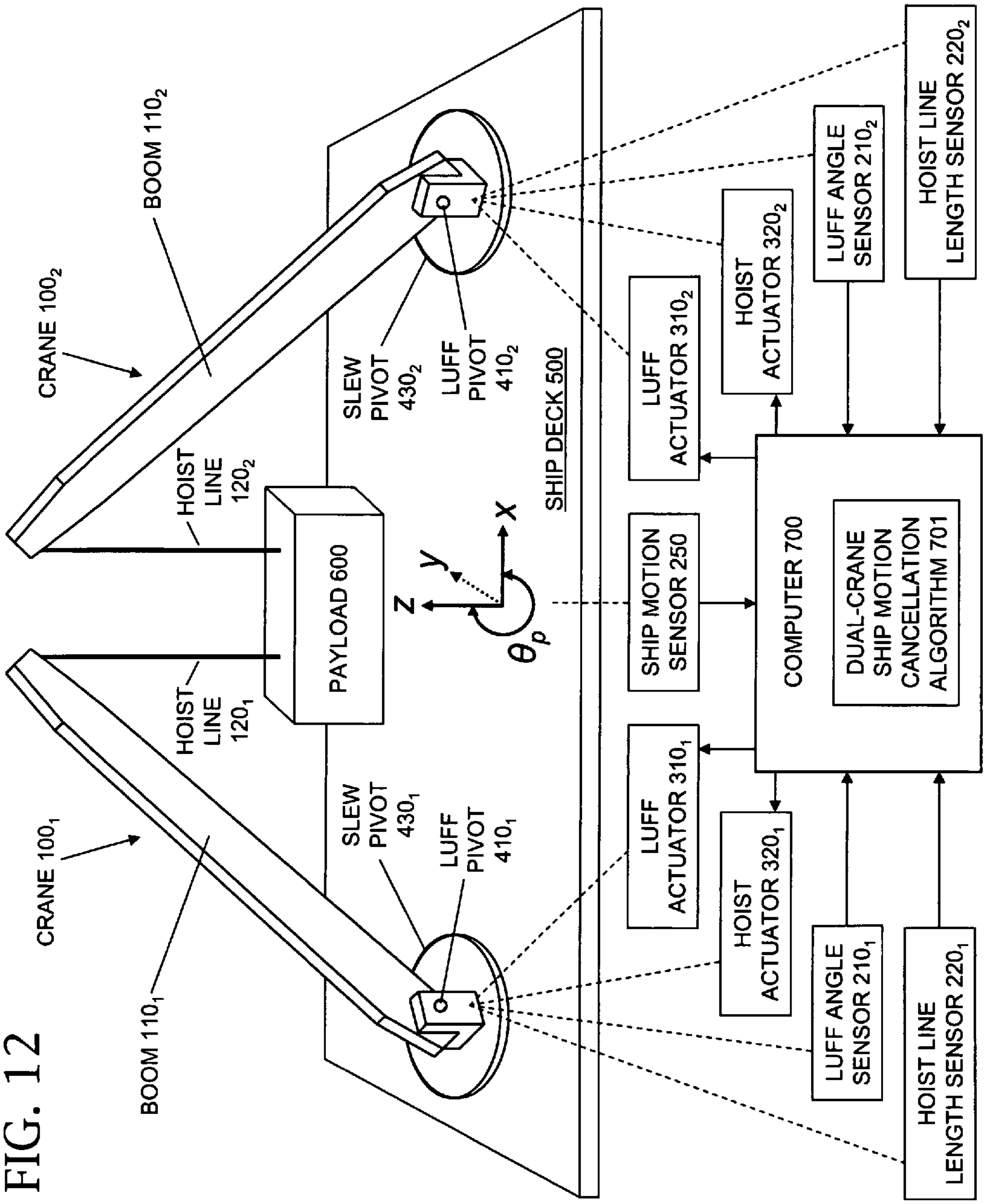
FIG. 12 is a schematic of an embodiment of a two-crane control system in accordance with the present invention, the inventive two-crane control system including computer, sensors, and actuators.

Now referring to FIG. 12, cranes $\mathbf{100}_1$ and $\mathbf{100}_2$ are each mounted on the main deck 500 of the same waterborne ship. The present invention's two-crane ship motion cancellation algorithm 701 is resident in a computer (e.g., processor-controller) 700. The four control parameters (first crane's luff angle $\beta_1$, first crane's hoist line length $L_{h1}$, second crane's luff angle $\beta_2$, second crane's hoist line length $L_{h2}$) are related to crane geometry sensors and crane geometry actuators. Computer 700 receives input from the four crane geometry sensors $\mathbf{210}_1$, $\mathbf{210}_2$, $\mathbf{220}_1$, and $\mathbf{220}_2$, and from the ship motion sensor 250. Computer 700 processes the input signals and transmits output signals to the four crane geometry actuators $\mathbf{310}_1$, $\mathbf{310}_2$, $\mathbf{320}_1$, and $\mathbf{320}_2$.

The term "computer," as used herein, broadly refers to any machine having a memory. According to typical inventive practice, a computer 700 is capable of receiving, processing, and transmitting electrical signals. The term "sensor," as used herein, broadly refers to any device that is capable of "sensing" something, such as "measuring" a physical quantity; that is, a sensor is any device that is capable of responding to a physical stimulus or physical stimuli so as to transmit an electrical signal that can be interpreted in a way that provides information (e.g., measurement information) pertaining to the physical stimulus or physical stimuli, such information being useful, for instance, for measurement and/or control purposes.

The inventive ship motion cancellation algorithm 701 avails itself of five crane geometry sensors (first crane's luff angle sensor $\mathbf{210}_1$, first crane's hoist line length sensor $\mathbf{220}_1$, second crane's luff angle sensor $\mathbf{210}_2$, second crane's hoist line length sensor $\mathbf{220}_2$), a ship motion sensor 250, and four crane geometry actuators (first crane's luff actuator $\mathbf{310}_1$, first crane's hoist actuator $\mathbf{320}_1$, second crane's luff actuator $\mathbf{310}_2$, second crane's hoist actuator $\mathbf{320}_2$). First crane's luff angle sensor $\mathbf{210}_1$ measures first crane's luff angle $\beta_1$. First crane's hoist line length sensor $\mathbf{220}_1$ measures first crane's hoist line length $L_{h1}$. Second crane's luff angle sensor $\mathbf{210}_2$ measures second crane's luff angle $\beta_2$. Second crane's hoist line length sensor $\mathbf{220}_2$ measures second crane's hoist line length $L_{h2}$.

The crane geometry sensors may be associated with the crane geometry actuators and/or with other crane machinery; for instance, luff angle sensors $\mathbf{210}_1$ and $\mathbf{210}_2$ may be associated with luff pivoting devices $\mathbf{401}_1$ and $\mathbf{401}_2$, respectively. Crane geometry actuators may include winches, or gears, or pneumatic devices, or hydraulic devices, or some combination thereof. Slew pivoting devices $\mathbf{431}_1$ and $\mathbf{431}_2$ are not pertinent to this example of inventive practice, but are shown for their pertinence to some embodiments of non-planar (three-dimensional) inventive practice.

According to typical inventive practice, absolute position and speed are both required for each of the four sensory geometry measurements, viz., first crane's luff angle $\beta_1$, first crane's hoist line length $L_{h1}$, second crane's luff angle $\beta_2$, second crane's hoist line length $L_{h2}$. Each crane geometry sensor is capable of providing a reference position as well as rate-of-motion information, for instance through the use of a combination of absolute and incremental optical encoders associated with crane machinery such as winches, gears, pneumatic devices, hydraulic devices, etc. Accordingly, when the instant disclosure speaks to inventive practice of sensing of the luff angle of a jig, it is to be understood that, typically, this sensing measures the luff angle and the luff-angular rotation rate of the jig. Furthermore, when the instant disclosure speaks to inventive practice of sensing of the length of a payload hoist line, it is to be understood that, typically, this sensing measures the length and the rate-of-change-of-length of the payload hoist line.

Ship motion sensor 250 can include, for instance, an inertial measuring device situated on the ship deck 500 to measure the sea-induced motion of the ship deck 500 in terms of (depending on the ship motion sensor 250) up to six degrees of freedom, viz., roll, pitch, yaw, heave, surge, and sway. The three kinds of translational ship motion are heave (linear movement along a vertical axis), surge (linear movement along a horizontal fore-and-aft axis), and sway (linear movement along a horizontal port-and-starboard axis); the three kinds of rotational ship motion are roll (rotational movement about a horizontal fore-and-aft axis), pitch (rotational movement about a horizontal port-and-starboard axis), and yaw (rotational movement about a vertical axis). In the simulative example discussed hereinabove, surge (FIG. 6), heave (FIG. 7), and pitch (FIG. 8) are measured by ship motion sensor 250, consistent with the two-dimensional, two-crane nature of this simulated inventive embodiment.

Each of cranes $\mathbf{100}_1$ and $\mathbf{100}_2$ has, situated in its cab, a crane operator who sends operator commands (electrical signals originating from the operator) to manually adjust the geometry of the crane. The operator is a human being who manipulates various handles, pedals, or buttons for exercising a degree of geometric control of his/her crane. For typical inventive embodiments, the operator commands include manual commands of the operator pertaining to slew, luff, and hoist.

On a continual basis, the present invention's automatic commands enhance the human operator commands. By means of a feedback-control loop, inventive computer 700 executes inventive algorithm 701 so as to process the sensory inputs and so as to transmit, to the respective luff and hoist actuators of cranes $\mathbf{100}_1$ and $\mathbf{100}_2$, electrical signals that tend to maintain steadiness, in two-dimensions (i.e., the x-z vertical geometric plane), of payload 600. The inventive algorithmic control signals are thus transmitted, directly or indirectly, to the electromechanical devices that are capable of affecting the respective geometries of the two cranes. The present invention thereby allows for active control of the payload by two cranes in elevated ship motion conditions, without requiring crane machinery performance beyond that which is available in standard marine crane design.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications, and changes to the principles disclosed herein may be made by one skilled in the art without departing from the true scope and spirit of the present invention, which is indicated by the following claims.

What is claimed is:

1. An active control method for facilitating joint lifting of a load by plural cranes situated onboard the same marine vessel, the active control method comprising sensing geometric parameters of said cranes, sensing motion of said marine vessel, determining solutions for said geometric parameters to approximate a static equilibrium condition preventing pendulation of said load, and adjusting said geometric parameters in accordance with the determined said solutions, wherein said sensing of said geometric parameters, said sensing of said motion of said marine vessel, said determining of said solutions for said geometric parameters, and said adjusting of said geometric parameters are performed on a continual basis during said joint lifting of said load by said cranes, said solutions for said geometric parameters being determined repeatedly so as to continually update said approximations of said static equilibrium condition preventing pendulation of said load, the active control method thereby, on a continual basis, coordinating said joint lifting of said load by said cranes so as to at least substantially prevent pendulation of said load that is caused by said motion of said marine vessel during said joint lifting of said load by said cranes.

2. The active control method of claim 1, wherein said determining includes using the sensed said geometric parameters and the sensed said motion.

3. The active control method of claim 1, wherein said cranes are two said cranes, and wherein said geometric parameters include luff angle and hoist line length of each said crane.

4. The active control method of claim 1, wherein:

said cranes are a first said crane and a second said crane;

said geometric parameters include the first said crane's luff angle $\beta_1$, the first said crane's hoist line length $L_{h1}$, the second said crane's luff angle $\beta_2$, and the second said crane's hoist line length $L_{h2}$;

said determining of said solutions for said geometric parameters includes incorporating said motion of said marine vessel in accordance with the following equation:

$$\begin{Bmatrix} \dot{L}_{h1} \\ \dot{L}_{h2} \\ \dot{\beta}_1 \\ \dot{\beta}_2 \end{Bmatrix} = W^{-1}A^T(AW^{-1}A^T)^{-1}\vec{y}.$$

5. The active control method of claim 4, wherein said motion of said marine vessel is relative to an x-y-z three-dimensional coordinate system, and wherein the determined said solutions yield, in the same x-z geometric plane situated in said x-y-z three-dimensional coordinate system:

zero motion of said load in the x direction;

zero motion of said load in the z direction;

zero rotational motion of said load about the y direction.

6. An apparatus comprising a computer configured to perform an active control method for facilitating joint lifting of a load by plural cranes situated onboard the same marine vessel, the method including receiving from said cranes sensory signals indicative of geometric parameters of said cranes, receiving from said marine vessel sensory signals indicative of motion of said marine vessel, calculating solutions for said geometric parameters to approximate a static equilibrium condition preventing pendulation of said load, and transmitting to said cranes control signals for adjusting said geometric parameters in accordance with the calculated said solutions, wherein said receiving of said sensory signals indicative of said geometric parameters, said receiving of said sensory signals indicative of said motion of said marine vessel, said calculating of said solutions for said geometric parameters, and said transmitting of said control signals for adjusting said geometric parameters are performed on a continual basis during said joint lifting of said load by said cranes, said solutions for said geometric parameters being calculated repeatedly so as to continually update said approximations of said static equilibrium condition preventing pendulation of said load, said computer thereby, on a continual basis, coordinating said joint lifting of said load by said cranes so as to at least substantially prevent pendulation of said load that is caused by said motion of said marine vessel during said joint lifting of said load by said cranes.

7. The apparatus of claim 6, wherein said calculating includes processing:

said sensory signals indicative of said geometric parameters; and said sensory signals indicative of said motion.

8. The apparatus of claim 6, wherein said cranes are two said cranes, and wherein said geometric parameters include luff angle and hoist line length of each said crane.

9. The apparatus of claim 6, wherein:

said cranes are a first said crane and a second said crane;

said geometric parameters include the first said crane's luff angle $\beta_1$, the first said crane's hoist line length $L_{h1}$, the second said crane's luff angle $\beta_2$, and the second said crane's hoist line length $L_{h2}$;

said calculating of said solutions for said geometric parameters includes incorporating said motion of said marine vessel in accordance with the following equation:

$$\begin{Bmatrix} \dot{L}_{h1} \\ \dot{L}_{h2} \\ \dot{\beta}_1 \\ \dot{\beta}_2 \end{Bmatrix} = W^{-1}A^T(AW^{-1}A^T)^{-1}\vec{y}.$$

10. The apparatus of claim 9, wherein said motion of said marine vessel is relative to an x-y-z three-dimensional coordinate system, and wherein the calculated said solutions yield, in the same x-z geometric plane situated in said x-y-z three-dimensional coordinate system:

zero motion of said load in the x direction;

zero motion of said load in the z direction;

zero rotational motion of said load about the y direction.

11. A computer program product for exerting active control with respect to plural cranes situated onboard the same marine vessel, said active control facilitating joint lifting by said cranes of a load, the computer program product comprising a non-transitory computer-readable storage medium having computer-readable program-code portions stored therein, the computer-readable program-code portions including:

a first executable program-code portion for receiving, from said cranes, sensory signals indicative of geometric parameters of said cranes;

a second executable program-code portion for receiving, from said marine vessel, sensory signals indicative of motion of said marine vessel;

a third executable program-code portion for calculating solutions for said geometric parameters to approximate a static equilibrium condition preventing pendulation of said load; and a fourth executable program-code portion for transmitting, to said cranes, control signals for adjusting said geometric parameters in accordance with the calculated said solutions;

wherein said receiving of said sensory signals indicative of said geometric parameters, said receiving of said sensory signals indicative of said motion of said marine vessel, said calculating of said solutions for said geometric parameters, and said transmitting of said control signals for adjusting said geometric parameters are performed on a continual basis during said joint lifting of said load by said cranes, said solutions for said geometric parameters being calculated repeatedly so as to continually update said approximations of said static equilibrium condition preventing pendulation of said load, said computer thereby, on a continual basis, coordinating said joint lifting of said load by said cranes so as to at least substantially prevent pendulation of said load that is caused by said motion of said marine vessel during said joint lifting of said load by said cranes.

12. The computer program product of claim 11, wherein said calculating includes processing:

said sensory signals indicative of said geometric parameters; and said sensory signals indicative of said motion.

13. The computer program product of claim 11, wherein said cranes are two said cranes, and wherein said geometric parameters include luff angle and hoist line length of each said crane.

14. The computer program product of claim 11, wherein:

said cranes are a first said crane and a second said crane;

said geometric parameters include the first said crane's luff angle $\beta_1$, the first said crane's hoist line length $L_{h1}$, the second said crane's luff angle $\beta_2$, and the second said crane's hoist line length $L_{h2}$;

said calculating of said solutions for said geometric parameters includes incorporating said motion of said marine vessel in accordance with the following equation:

$$\begin{Bmatrix} \dot{L}_{h1} \\ \dot{L}_{h2} \\ \dot{\beta}_1 \\ \dot{\beta}_2 \end{Bmatrix} = W^{-1}A^T(AW^{-1}A^T)^{-1}\vec{y}.$$

15. The computer program product of claim 14, wherein said motion of said marine vessel is relative to an x-y-z three-dimensional coordinate system, and wherein the calculated said solutions yield, in the same x-z geometric plane situated in said x-y-z three-dimensional coordinate system:

zero motion of said load in the x direction;

zero motion of said load in the z direction;

zero rotational motion of said load about the y direction.

* * * * *